US008834312B2

(12) United States Patent
Kücükyavuz et al.

(10) Patent No.: US 8,834,312 B2
(45) Date of Patent: Sep. 16, 2014

(54) MILL DRIVE SYSTEM

(75) Inventors: Ali Kemal Kücükyavuz, Herne (DE); Friedhelm Pötter, Bergkamen (DE); Franz Schmeink, Bocholt (DE)

(73) Assignee: SIEMENS Aktiengesellschaft, Munich (DE)

( * ) Notice: Subject to any disclaimer, the term of this patent is extended or adjusted under 35 U.S.C. 154(b) by 147 days.

(21) Appl. No.: 13/642,384

(22) PCT Filed: Mar. 17, 2011

(86) PCT No.: PCT/EP2011/054055

§ 371 (c)(1),
(2), (4) Date: Oct. 19, 2012

(87) PCT Pub. No.: WO2011/131430

PCT Pub. Date: Oct. 27, 2011

(65) Prior Publication Data

US 2013/0035189 A1 Feb. 7, 2013

(30) Foreign Application Priority Data

Apr. 19, 2010 (EP) .................................... 10004127

(51) Int. Cl.
*F16H 57/04* (2010.01)

(52) U.S. Cl.
USPC ........................................... 475/159; 475/330

(58) Field of Classification Search
USPC ..................... 475/5, 159, 330, 337; 74/606 R
See application file for complete search history.

(56) References Cited

U.S. PATENT DOCUMENTS

| | | | | |
|---|---|---|---|---|
| 2,321,126 A * | 6/1943 | Breuer | .......................... | 417/367 |
| 3,576,143 A | 4/1971 | Baits | | |
| 3,658,264 A | 4/1972 | Schauer | | |

(Continued)

FOREIGN PATENT DOCUMENTS

| | | |
|---|---|---|
| CH | 658801 A5 | 12/1986 |
| CN | 1579635 A | 2/2005 |

(Continued)

OTHER PUBLICATIONS

Hsu John et al; "Thermal Control for Power Electronics and Motors"; Power Electronics end Electric Machines, FY2006 Progress Report; pp. 7-140; 2006.

(Continued)

*Primary Examiner* — Justin Holmes
(74) *Attorney, Agent, or Firm* — Henry M. Feieereisen LLC

(57) ABSTRACT

A mill drive system includes a gear unit which is arrangeable below a grinding plate and has at least one planetary and/or spur gear stage, having a vertical shaft position. The mill drive system includes an electric motor, integrated into a housing of the gear unit and having a rotor and a stator which have vertically extending axes. Upper and lower bearing covers each including bearing seats for rotor shaft bearing are mounted on opposite end faces on the rotor and stator and are connected via a stator carrier, which has cooling fins on the outer periphery. A collecting tray for coolant is formed between the lower bearing cover and a base part of the housing. The motor is supported via a flange which is formed on an inner face of the housing and extends radially inward and to which the lower and/or upper bearing covers are connected.

12 Claims, 2 Drawing Sheets

(56) References Cited

U.S. PATENT DOCUMENTS

| | | | | |
|---|---|---|---|---|
| 4,087,052 | A | 5/1978 | Rohrbach | |
| 4,198,191 | A * | 4/1980 | Pierce | 417/369 |
| 4,572,442 | A | 2/1986 | Sigg | |
| 4,887,489 | A | 12/1989 | Sigg | |
| 4,930,201 | A | 6/1990 | Brown | |
| 5,524,840 | A * | 6/1996 | Gygi | 241/117 |
| 7,663,272 | B2 | 2/2010 | Chaing | |
| 2003/0102728 | A1 * | 6/2003 | Chen et al. | 310/52 |
| 2006/0125337 | A1 | 6/2006 | Levnat | |
| 2008/0220925 | A1 * | 9/2008 | Schwingshandl | 475/219 |
| 2010/0230520 | A1 | 9/2010 | Brammer et al. | |
| 2013/0035189 | A1 | 2/2013 | Kücükyavuz et al. | |

FOREIGN PATENT DOCUMENTS

| | | | |
|---|---|---|---|
| CN | 202212229 | U | 5/2012 |
| DE | 2044441 | A1 | 4/1971 |
| DE | 3320037 | C1 | 11/1984 |
| DE | 3712562 | C1 | 5/1988 |
| DE | 3931116 | A1 | 3/1991 |
| DE | 10305915 | A1 | 8/2004 |
| EP | 09011589.0 | | 3/2011 |
| GB | 463191 | A | 3/1937 |
| JP | 2005052799 | A | 3/2005 |
| SU | 871818 | A1 | 10/1981 |
| SU | 1227238 | A1 | 4/1986 |
| WO | WO 2007004082 | A1 | 1/2007 |
| WO | WO 2008031694 | A1 | 3/2008 |
| WO | WO 2009068484 | A1 | 6/2009 |
| WO | WO 2010020287 | A1 | 2/2010 |

OTHER PUBLICATIONS

Electrical Science; "Electrical Science—AC Motor Construction": Internet: http://electrical-science.blogspot.de/2009/12/ac-motor-construction.html; pp. 1-5; 2009; Dec. 31, 2009.

Smith Electrical Products Company, AO.; "the AC's & DC's of Electric Motors"; Motor Mastery University; vol. 9/02; No. 3100; pp. 1-40; 2002.

Danfoss: "Anwendertipps—Frequenzumrichter"; pp. 1-14; 2009.

Culbert I. M.; "A review of cleaning methods for motor windings"; IEEE; pp. 1-6; 2008.

Siemens; "Efficient, Integrated vertical mill drive with high performance"; Internet: http://www.siemens.com/press/en/pressrelease/?press=en/pressrelease/2010/drive_technologies/idt2010032313.htm; pp. 1-3, 2010; Mar. 16, 2010.

* cited by examiner

MILL DRIVE SYSTEM

CROSS-REFERENCES TO RELATED APPLICATIONS

This application is the U.S. National Stage of International Application No. PCT/EP2011/054055, filed Mar. 17, 2011, which designated the United States and has been published as International Publication No. WO 2011/131430 and which claims the priority of European Patent Application, Serial No. 10004127.6, filed Apr. 19, 2012, pursuant to 35 U.S.C. 119 (a)-(d).

BACKGROUND OF THE INVENTION

Known mill drive systems comprise one or more gear stages for transmitting the drive power of an electric motor. Gear stages and electric motor in such cases form a drive train closely coupled to a working process within for example a bowl mill, a mixing drum, a crusher, a tube mill or a rotary furnace, which is subjected to considerable feedback from the working process. Usually bevel gear stages are used to link the electric motor to the drive train.

A drive facility for a mill having a vertical construction is described in DE 39 31 116 A1, in which a housing of a reduction gear is screwed firmly to the mill. In this case an exact alignment of axes of drive pinion and girth gear spaced widely apart is necessary. In addition an introduction of axial mill forces via an axial thrust bearing in a common gear housing causes significant strain for a meshing engagement of the teeth in the reduction gear. The fact that the gear space and the inner mill bearing are the same size means that the conditions are right for a rapid contamination of lubricating oil for the drive facility. In addition a mechanical power branch in the reduction gear proves problematic in view of the lack of compensation for surplus constraining forces.

A drive facility for a vertical crusher is known from JP 2005 052799 A, which is driven either via a girth gear on a rotatable base disk or via a multi-stage bevel gear. As a consequence of a lack of adjustment movement at a drive stage of the drive facility impact loads are transmitted from the working process into the drive facility, especially into its teeth area.

WO 2009/068484 A1 describes a planetary gear with one or more gear stages for driving a working machine surrounded by a girth gear, which comprises a gear housing accommodating the gear stages and a movement-adjustable toothed pinion, which meshes with the girth gear, disposed on a take-off shaft of a take-off stage. The gear housing consists of a first inherently stiff housing part and a second fixed housing part. The first housing part surrounds the take-off stage with the take-off shaft and the movement-adjustable toothed pinion and has side walls projecting beyond the gear which rest on the base. The second housing part is attached without touching the base on an end face side to the first housing part.

The older European patent application with the application file reference 09011589.0 describes a mill drive system with a gear able to be disposed below a grinding plate with at least one planetary and/or spur gear stage as well as an electric motor integrated into a housing of the gear. In addition the mill drive system comprises a converter with an assigned closed-loop control system for controlling the speed of the motor without any play in the meshing of the teeth.

A mill drive system is known from WO 2010/20287 with an integrated motor gear unit having a shared coolant circuit. The motor-gear unit is supported on a base plate of the housing surrounding the motor-gear unit.

The object of the present invention is thus to create an integrated mill drive system which makes it possible to install a motor unit in a simpler manner and to cool the motor unit efficiently.

SUMMARY OF THE INVENTION

In accordance with the invention this object is achieved by a mill drive system including a gear unit having a vertical shaft position and including at least one planetary and/or spur gear stage, wherein the gear unit can be arranged below a grinding plate, an electric motor having a rotor and a stator and being integrated into a housing of the gear unit, wherein the rotor and the stator have a vertically extending axis, an upper bearing cover and a lower bearing cover, wherein the upper and lower bearing covers are mounted on opposing end face sides on the rotor and the stator, and include bearing seats for rotor shaft bearings, a stator carrier connecting the upper bearing cover with the lower bearing cover, wherein the stator carrier has an outer circumference provided with cooling fins, wherein nozzles mounted on the housing and/or embedded into the housing are directable onto the cooling fins, a collecting tray for coolant formed between the lower bearing cover and a base part of the housing, and a flange formed on an inner side of the housing and extending radially inwards, wherein the lower and/or upper bearing cover being connected to the flange, and wherein the motor is supported via the flange. Advantageous developments of the present invention are specified in the dependent claims.

The inventive mill drive system comprises a gear unit able to be disposed below a grinding plate with at least one planetary and/or spur gear stage which has a vertical shaft position. Furthermore an electric motor, the rotor and stator of which have vertically extending axes, is also integrated into a housing of the gear unit. Moreover an upper bearing cover and a lower bearing cover comprising bearing seats for rotor shaft bearings are mounted on opposite end faces on the rotor and stator. The upper bearing cover and the lower bearing cover are connected via a stator carrier which has cooling fins on the outer periphery. Nozzles mounted on the housing and/or embedded into the housing can be aligned on these cooling fins. A collecting tray for coolant is formed between the lower bearing cover and a base part of the housing. Coolant located in the collecting tray can thus be used for additional cooling of the motor. The motor is supported via a flange which is formed on an inner face of the housing and extends radially inwards and to which the lower and/or upper bearing covers are connected. This makes it possible to easily install a motor unit in the mill drive system by suspending it in the housing via the upper and/or lower bearing cover. The motor can in such cases essentially be supported exclusively via the flange on the inner side of the housing. A completely vertical arrangement of grinding plate, gear unit and motor also makes it possible to dispense with relatively expensive spur gear units.

The motor is preferably cooled by means of lubricant or coolant circulating through the gear unit. When the motor is integrated into a lubricant circuit of the gear unit expensive ventilation measures for sufficient cooling of the motor can be dispensed with. Moreover a lubricating-oil-proof jacket for rotor or stator windings of the motor, to seal them against lubricant circulating within the housing, can be provided.

Furthermore a preferred embodiment of the inventive mill drive system comprises a converter with an assigned closed-loop control device for regulating the speed of the motor without meshing play in the gear teeth. By using a converter for regulating the motor speed a decoupling between power supply and motor torque is achieved. In this way meshing damage during short-term interruptions as a result of a power failure can be avoided since, because of the inventive speed regulation of the motor, no meshing play is caused in the direction of rotation in the gear unit by a power failure. Moreover by using a converter a plurality of application-specific transmission variants can be realized with reduced number of meshing component types. The speed regulation enables the respective processing process with the inventive mill drive system to additionally be operated at an optimum working point. This improves the efficiency of the grinding process. This in its turn makes a reduction in energy consumption possible.

Preferably at least one axle bearing for the rotor shaft is disposed between a rotor hub and the lower bearing cover. This makes an especially compact design possible. Moreover the gear unit in accordance with a preferred embodiment of the present invention comprises at least two planetary stages and the housing is designed in the least two parts. In addition a housing separating joint is provided between a first and second planetary stage. In this way an integrated mill drive system can be divided into easily-transportable units which can then be rapidly assembled again at the installation location.

In accordance with an advantageous development of the present invention the motor is a permanently-excited synchronous machine, of which the rotor magnet system is welded into a stainless steel jacket. Since only small thermal losses occur at the rotor in this way no rotor cooling is necessary. As an alternative to a permanently-excited synchronous machine the motor can also be designed as an externally-excited synchronous or asynchronous machine.

The present invention is explained in greater detail below with reference to an exemplary embodiment on the basis of the drawing, in which

DETAILED DESCRIPTION OF PREFERRED EMBODIMENTS

Figure 1:
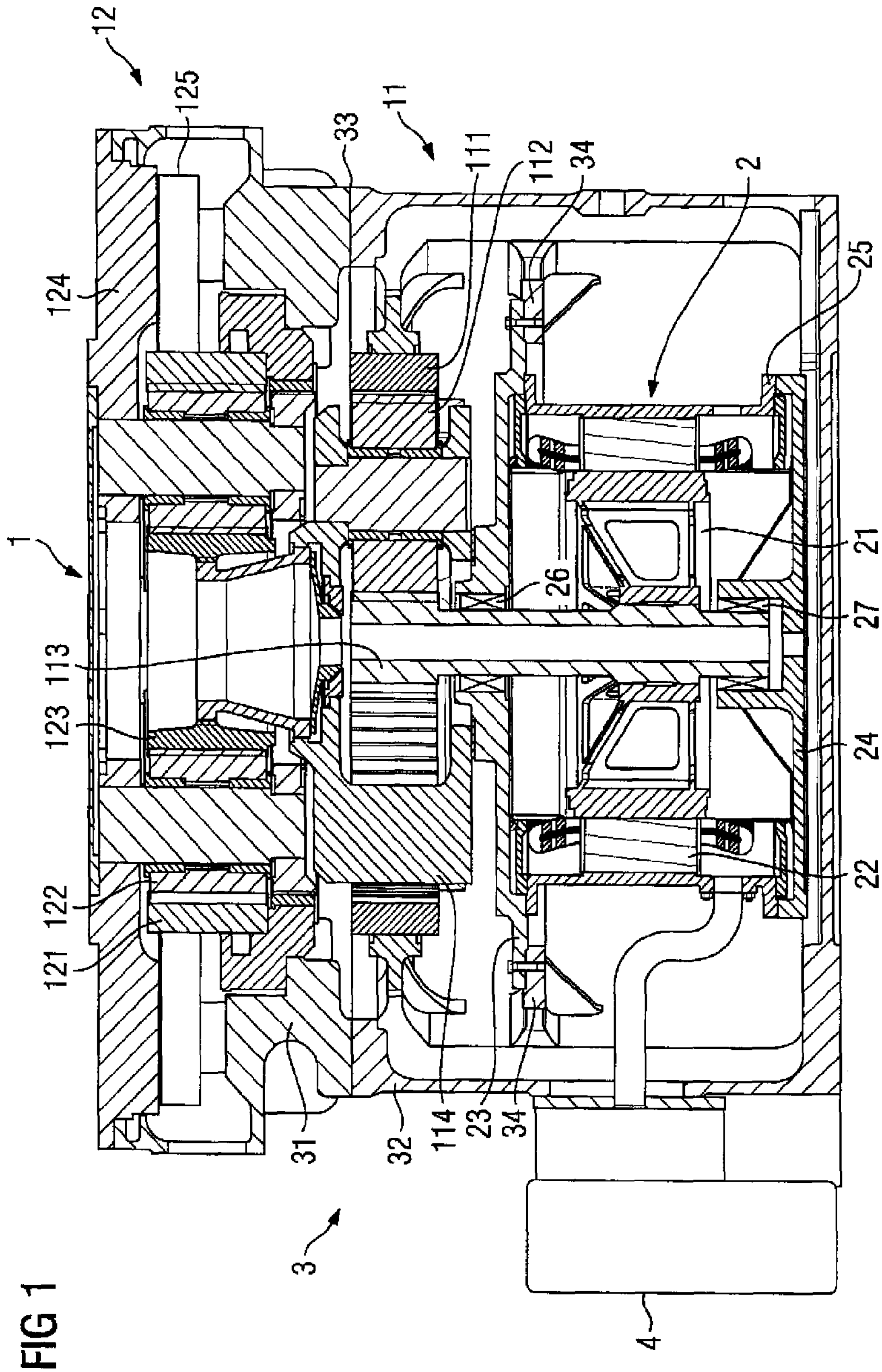
FIG. 1 shows an inventive mill drive system in a cross-section.

The mill drive system shown in FIG. 1 comprises a gear unit 1 able to be disposed below a grinding plate with two planetary stages 11, 12, which have a vertical shaft position. Integrated into a housing 3 of the gear unit 1 is an electric motor 2, the rotor 21 and stator 22 of which have axes extending vertically. An upper bearing cover 23 and a lower bearing cover 24 are mounted on opposing end faces on rotor 21 and stator 22, which comprise bearing seats for rotor shaft bearings 26, 27. The upper bearing cover 23 and the lower bearing cover 24 are connected via a bearing carrier 25 which, on an outer circumference, has cooling fins 28 shown in FIG. 2. Directed towards these cooling fins 28 are injection nozzles 35 mounted on the housing 3. Formed between the lower bearing cover 34 and a base part of the housing 3 is a collecting tray for catching coolant.

The motor 2 is supported by a flange 34 mounted on an inner side of the housing 3 extending radially inwards, with which the upper bearing cover 23 is connected. The motor 2 in the present exemplary embodiment is supported exclusively via the flange 34 on the inner side of the housing 3.

The two planetary stages 11, 12 each comprise a ring gear 111, 121, a planetary carrier 114, 124 with planetary wheels supported therein 112, 122 and a sun wheel 113, 123. The ring gears 111, 121 of the planetary stages 11, 12 are connected firmly to the housing 3. The planetary carrier 124 of a take-off-side planetary stage 12 is supported by means of an axial bearing 125. The sun wheel 113 of the drive-side planetary stage 11 is connected to a rotor shaft of the motor 2.

Rotor shaft and sun wheel shaft of the drive-side planetary stage 11 are preferably connected via a coupling disposed below or above the motor 2. Moreover, in the present exemplary embodiment, the planetary carrier 114 of the drive-side planetary stage 11 and the sun wheel 123 of the take-off-side planetary stage 12 are connected to one another.

The motor 2 is connected to a lubricant supply or coolant circuit of the gear unit 1. In this way the motor 2 can be cooled by means of lubricant circulating through the gear unit 1. Provided on the rotor 21 is a lubricant-proof jacket for sealing the rotor against lubricant circulating within the housing 3. Preferably an air gap between the rotor 21 and stator 22 is adjoined correspondingly in the radial direction by a lubricant-prove jacket of a laminated stator package comprising windings of the stator 22.

To encapsulate the stator 22 an envelope is provided. As well as the envelope, the stator 22 has a clamping flange, a clamping element and an elastic seal. With the aid of the clamping element the elastic seal is pressed onto the clamping flange and the envelope. Any suitable stator housing part can be used for encapsulating the stator 22, in that the elastic seal exerts a pressure on the latter by a pre-tensioning. Further details for encapsulating rotor 21 and stator 22 are to be found in the older German patient application DE 10 2009 034 158.7, the disclosure of which is herewith referenced.

Provided in the rotor 21 are a number of openings extending axially for lubricant run-off from the gear unit 1 into the collecting tray below the motor 2. The collecting tray can for example be divided into an inner area for gear unit lubricant and into an outer area for motor coolant.

In the present exemplary embodiment the motor 2 is a permanently excited synchronous machine, of which the rotor magnet system is welded into a stainless steel jacket. This makes possible especially low electrical losses. As an alternative to this the rotor magnet system can be enclosed within a non-conductive or non-magnetic material.

The mill drive system shown in FIG. 1 also has a converter 4 with an assigned closed-loop control device for regulating the speed of the motor 2 without meshing play, so that that there is no play between tooth flanks of the gear unit 1 in the direction of rotation. Mechanical inherent frequencies of a mill drive motor system become non-critical if a converter 4 is used as a result of a system component decoupling. Tooth flanks of the gear unit 1 are held under constant force fit in such cases by applying a minimum torque. Direction-changing loads of the tooth flanks are largely suppressed by this.

Figure 2:
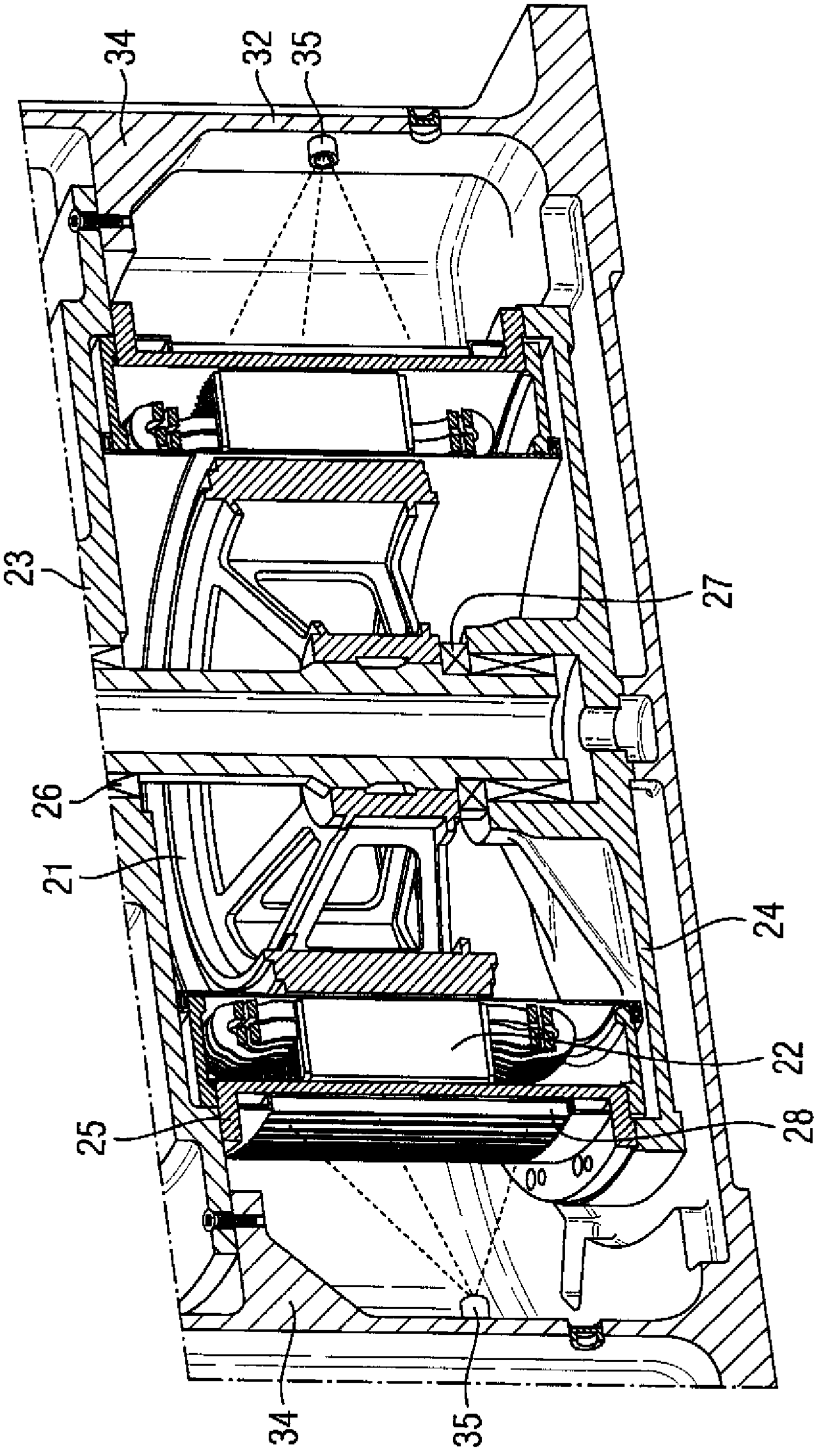
FIG. 2 shows an inventive mill drive system in a perspective cross section.

In the mill drive system shown in FIG. 2 an axial bearing 27 for the rotor shaft is disposed between a hub of the rotor 21 and the lower bearing cover 24. Moreover the housing 3 is embodied in two parts in the present exemplary embodiment and comprises a take-off-side housing part 31 and a drive-side housing part 32. In this case a housing separating joint 33 is provided in an area between the take-off-side planetary stage 12 and the drive-side planetary stage 11.

Preferably the outer diameter of the motor 2 is smaller than the inner diameter of the ring gears 111, 121 of the planetary stages 11, 12. In this way a simple layout of the mill drive system from the manufacturing standpoint is produced. As an alternative to this only the outer diameter of the rotor 21 is smaller than the inner diameter of the ring gears 111, 121, and the stator 22 is made of a number of segments extending in the circumferential direction.

The use of the present invention is not restricted to the exemplary embodiment described.

What is claimed is:

1. A mill drive system comprising:

a gear unit having a vertical shaft position and including at least one planetary and/or spur gear stage, said gear unit being be arrangeable below a grinding plate;

an electric motor having a rotor and a stator and being integrated into a housing of the gear unit, wherein the rotor and the stator have a vertically extending axis;

an upper bearing cover and a lower bearing cover, said upper and lower bearing covers being mounted on opposing end face sides on the rotor and the stator, and comprising bearing seats for rotor shaft bearings;

a stator carrier connecting the upper bearing cover with the lower bearing cover, said stator carrier having an outer circumference provided with cooling fins, wherein nozzles mounted on the housing and/or embedded into the housing are directable onto the cooling fins;

a collecting tray for coolant formed between the lower bearing cover and a base part of the housing; and a flange formed on an inner side of the housing and extending radially inwards, said lower and/or upper bearing cover being connected to the flange, said motor being supported via the flange.

2. The mill drive system of claim 1, wherein the motor is essentially exclusively supported via the flange on the inner side of the housing.

3. The mill drive system of claim 1, further comprising at least one axial bearing for the rotor shaft and a rotor hub, said at least one axial bearing being disposed between the rotor hub and the lower bearing cover.

4. The mill drive system of claim 1, further comprising at least two of said planetary gear stages, wherein the housing is configured in at least two parts, and wherein a housing-separating joint is provided in an area between a first one and a second one of the at least two planetary gear stages.

5. The mill drive system of claim 1, wherein the electric motor is connected to a lubricant supply and/or coolant circuit of the gear unit.

6. The mill drive system of claim 1, further comprising a converter with and a closed-loop control device assigned to the converter for controlling a rotational speed of the electric motor in a tooth mesh play-free manner.

7. The mill drive system of claim 1, further comprising a lubricant-proof jacket for sealing windings of the rotor and/or stator against lubricant circulating within the housing.

8. The mill drive system as of claim 1, wherein the at least one planetary stage includes a ring gear, and wherein an outer diameter of the electric motor is smaller than an inner diameter of the ring gear.

9. The mill drive system of claim 1, wherein the at least one planetary stage includes a ring gear, wherein an outer diameter of the rotor is smaller than an inner diameter of the ring gear, and wherein the stator is made of a plurality of segments extending in a circumferential direction.

10. The mill drive system of claim 1, wherein the electric motor is constructed as a permanently-excited synchronous machine comprising a rotor magnet system and a stainless steel jacket, and wherein-the rotor-magnet system is welded into the stainless steel jacket.

11. The mill drive system of claim 1, wherein the electric motor has a rotor-magnet system that is welded without a seal into a stainless steel jacket.

12. The mill drive system of claim 1, wherein the motor has a rotor-magnet system which is enclosed in a jacket made of at least one non-conductive and/or non-magnetic material.

* * * * *

UNITED STATES PATENT AND TRADEMARK OFFICE

CERTIFICATE OF CORRECTION

PATENT NO. : 8,834,312 B2
APPLICATION NO. : 13/642384
DATED : September 16, 2014
INVENTOR(S) : Ali Kemal Kücükyavuz, Friedhelm Pötter and Franz Schmeink It is certified that error appears in the above-identified patent and that said Letters Patent is hereby corrected as shown below:

Title page: Please change (74) “Henry M. Feieereisen LLC”, to -- Henry M. Feiereisen LLC --

Signed and Sealed this
Thirteenth Day of January, 2015

Michelle K. Lee

Michelle K. Lee
*Deputy Director of the United States Patent and Trademark Office*